United States Patent Office 2,819,279
Patented Jan. 7, 1958

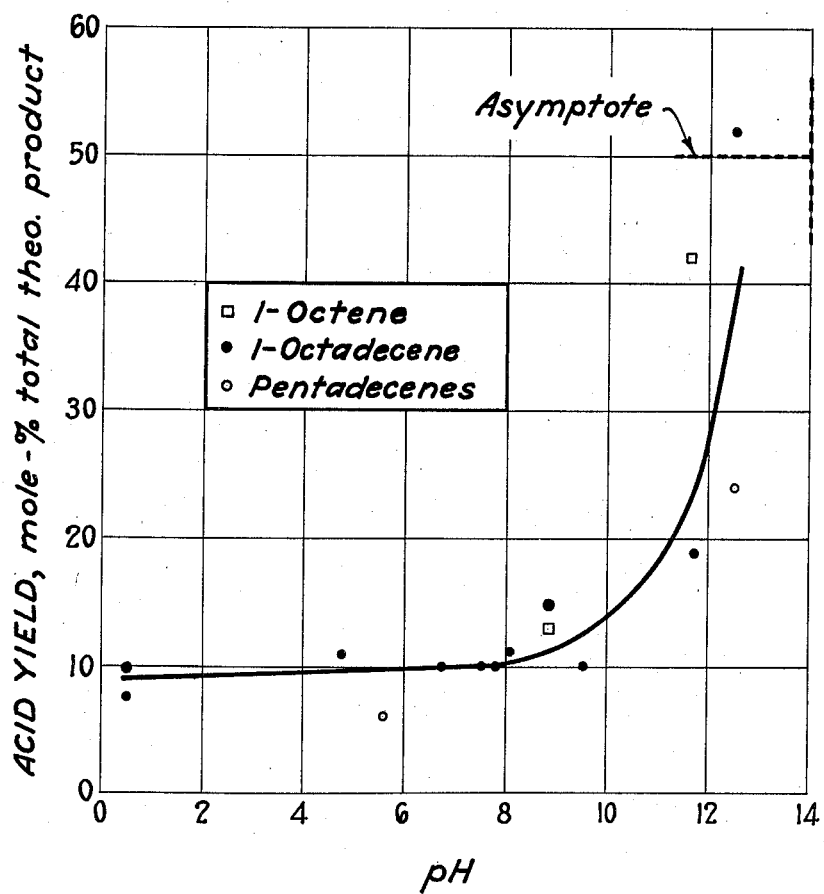

2,819,279

OZONIZATION OF OLEFINIC COMPOUNDS TO A CARBOXYLIC ACID AND AN ALDEHYDE

Arthur B. Brown and Joseph W. Sparks, Hammond, Ind., assignors to Standard Oil Company, Chicago, Ill., a corporation of Indiana Application July 22, 1950, Serial No. 175,418

2 Claims. (Cl. 260—413)

This invention relates to the ozonization of organic compounds containing an olefinic double bond. More particularly, it relates to an improvement in the ozonization of olefinic compounds whereby the decomposition of the ozonides is facilitated and the character of the reaction products is controlled.

The reaction of ozone with unsaturated organic compounds has been known for many years, and has been the subject of extensive study. The art relating thereto has been collected and analyzed by long ("The Ozonization Reaction," Chemical Reviews, 27, 437–493 (1940)). A number of conflicting theories as to the mechanism of the reaction have been advanced. The following series of reactions, in which R and R' represent hydrogen or organic radicals, describe a mechanism which has received considerable support:

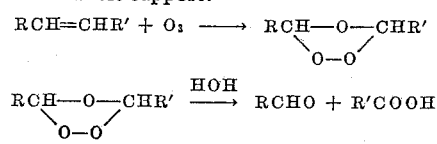

Many of the ozonides obtained in the first of the foregoing reactions are explosive. Suitable precautions must therefore be made in decomposing them or in otherwise converting them into useful products.

Many methods have been developed for preparing useful products from the ozonides, such as hydrogenation to convert them into alcohols, hydrolysis to convert them into a mixture of aldehydes and acids, oxidation to convert them into acids, and the like. In all of the various methods, serious difficulties have heretofore been encountered in controlling the rate of the reaction and the composition of the resulting reaction product.

We have now devised an improved process in which the ozonization reaction and the decomposition of the resulting ozonides are carried out simultaneously, and we have discovered critical pH ranges for maximum production of carboxylic acids and of aldehydes.

When the ozonization reaction is carried substantially to completion, and the resulting ozonides are subsequently hydrolyzed by reaction with water, the hydrolysis reaction is in some cases so violent that there is serious danger of explosion, and the hydrolysis mixture tends to become overheated, so that the yield of products is lowered through degradation of reaction materials, while in other cases the ozonides are extremely resistant to the action of water. We have now discovered that these difficulties can be avoided by carrying out the hydrolysis of the ozonides in situ as formed. This is advantageously effected by intimately commingling the olefinic charging stock with water or with an aqueous solution and subsequently passing a gasiform stream containing ozone through the commingled mixture. The ozone is readily absorbed from the ozone-bearing gas stream (air or oxygen), and the resulting ozonides are immediately hydrolyzed, with the result that the ozonide concentration remains extremely low, probably of the order of magnitude of parts per million or at most tenths of a percent.

We have also found that the production of carboxylic acids in our improved process can be greatly increased by adjusting and maintaining the pH of the aqueous phase at a level above about 9 by adding thereto a basic compound of an alkali metal, an alkaline-earth metal, or a quaternary ammonium compound. We prefer to use inorganic compounds, such as the oxides, hydroxides, and basic salts of the alkali and alkaline-earth metals. Among the suitable compounds are sodium hydroxide, potassium hydroxide, lithium hydroxide, calcium oxide, barium hydroxide, dipotassium hydrogen phosphate, sodium acetate, and the like.

When our process is carried out at a pH above about 9, we have observed that the ratio of acid to aldehyde is a direct function of the pH, and approaches 1:1, molar, as a limit. This limiting yield of acid is 50 mole-percent of the products theoretically derivable by ozone-cleavage of an olefin. We have further observed that in the cleavage of the ozonide, the shorter fragment of the olefin tends to be preferentially converted into carboxylic acid; while the longer fragment tends to be converted into the aldehyde. When it is desired to produce the maximum yield of acids, i. e., about one mole of acid per mole of olefin, the quantity of alkaline compounds dissolved in the aqueous phase should be at least sufficient to react with all of the acids produced in the ozonide-decomposition reaction, and an excess of the alkaline compound may be used as a precautionary measure.

Below about pH 9, the conversion to acids is comparatively small, and the reaction product consists largely of aldehydes. Between about pH 5 and 9, however, the reaction is erratic, and the yields and product compositions exhibit an unpredictable and undesirable degree of variance. For this reason, when we employ our process to prepare aldehydes, we prefer to operate at a pH below about 5.

The combined ozonizing and ozonide-decomposition reactions are satisfactorily carried out at atmospheric pressure (though increased pressure may be of assistance), and at ordinary temperatures around 60 to 100° F., although we have conducted the reaction successfully over the range of 35 to 150° F. For best aldehyde yields, the lower temperatures are favored to minimize polymerization; and for best acid yields the higher temperatures are favored.

Our process is applicable broadly to the treatment of organic compounds containing an olefinic linkage. Aldehydes and carboxylic acids are obtainable from olefinic compounds containing the grouping, $$RCH=$$

where R is an organic radical. Both aldehydes and carboxylic acids are obtainable from olefinic compounds having the formula $$RCH=CHR'$$

where R and R' are hydrogen or organic radicals. Ketones are obtainable from olefinic compounds containing the grouping,

where R and R' are the same or different organic radicals. These differences among the various types of olefins are well known in the art. Our olefinic charging stock may also contain various functional groups which may tend to be oxidized by ozone and to be changed or destroyed thereby. This effect, however, is not to be construed as rendering our process inoperative with respect to such compounds, since even in such cases the desired cleavage of the double bond takes place, with ultimate formation of oxygen-containing products, including aldehydes, ketones, and carboxylic acids. Thus, our process is capable of converting olefinic hydrocarbons, acids, esters, aldehydes, ketones, ethers, and the like, of the aliphatic and naphthenic classes and derivatives thereof containing an organic-radical substituent. In an especially advantageous embodiment of our process, we have succeeded in producing aldehydes and carboxylic acids from $C_4$ to $C_{30}$ olefinic hydrocarbons obtained by hydrogenating carbon monoxide in the presence of an alkali-promoted iron catalyst. A mixture of such olefins may be ozonized, and the resulting organic phase may be fractionally distilled to obtain the individual aldehydes. Preferably, however, the olefins are fractionally distilled first to simplify the separation of the reaction product, thus minimizing the opportunities for the aldehydes to condense, polymerize, and resinify on being distilled.

In carrying out our process, a charging stock containing an olefinic compound is vigorously agitated with an immiscible aqueous phase until the two phases are broken up and dispersed in each other. Thereafter a stream of air or oxygen which has been treated in a conventional manner to produce ozone therein, suitably but not necessarily in a concentration between about 2 and 8 percent, is passed into the mixture with continued agitation. The ozone is absorbed rapidly and completely until substantially all of the olefinic constituent of the charging stock has been ozonized; and as soon as free ozone appears in the vent gases, the flow of ozone-containing gas is stopped. The resulting reaction mixture is then treated in a conventional manner to isolate the reaction products. For example, the mixture is allowed to stratify, and the organic phase is withdrawn. The aqueous phase is stripped to separate volatile organic materials therefrom, which are added to the organic phase. The combined organic materials are distilled to recover the aldehydes produced by the reaction. The residual aqueous phase is acidified with sulfuric acid, carbon dioxide, or the like, and the liberated carboxylic acids are purified by distillation.

The ratio of water to olefinic compound should preferably be at least about equimolar, but substantially higher ratios (for example, from 2:1 to 100:1, molar) may conveniently be used without deleterious effect on the reaction. A mutual solvent may be used for the olefin and aqueous phases, if desired, in order to improve the contact between the phases, and various types of emulsifying agents may also be used. These are not necessary, however, so long as the phases are adequately commingled by means of agitation; and the use of mutual solvents or emulsifying agents tends to complicate the ensuing treatment of the reaction product.

Our invention will be more fully understood from the following specific examples. In each of the experiments described below, about 0.01 to 0.02 gram-mole of the designated olefin was dissolved in 35 ml. of pentane, and the resulting solution was agitated vigorously with 45 ml. of an aqueous solution having the desired pH. The aqueous solution was prepared by dissolving therein a sufficient quantity of an acid, base, and/or salt to produce the desired pH, which was measured prior to and during each experiment with a calibrated pH meter. Agitation of the mixed phases was effected by means of a stirrer operating at a speed sufficiently high to disperse the two phases in each other in finely divided form, thereby providing a large surface of contact between the phases. Into the reaction mixture, maintained at a temperature between about 25 to 30° C., was passed a stream of oxygen containing 7 percent ozone, and the vent gases were passed through a potassium iodide-starch indicator solution. The ozone was completely absorbed so long as any olefinic compounds remained unreacted in the reaction vessel, and the treatment with ozone was stopped as soon as the presence of ozone in the vent gases was evidenced by the appearance of blue color in the potassium iodide-starch indicator solution. The reaction product was extracted once with 50 ml. of ethyl ether, and the ether solution and the aqueous phase were analyzed for acid and aldehyde content. More specific details and results are given below.

Example I 1-octene was ozonized as described above at two pH levels. In each experiment, 1.12 gram of 1-octene was charged to the reaction vessel. The results were as follows:

| Aqueous Solution | | Experiment | Product | | Yield | |
|---|---|---|---|---|---|---|
| pH | Solute | | Aldehydes, g.-moles | Acids, g.-moles | Aldehydes, Percent of theo. | Acids, Percent of theo. |
| 8.86 | $K_2HPO_4$ | 1 | 0.0140 | 0.00268 | 70 | 13 |
| 11.55 | KOH, $K_2HPO_4$ | 1 | 0.00934 | 0.00830 | 47 | 42 |

Example II

A mixture of 2-pentadecene and 3-pentadecene was subjected to ozonization as described above. In the experiment, 2.10 grams of the mixed pentadecenes were introduced into the reaction vessel. The results were as follows:

| Aqueous Solution | | Experiment | Product | | Yield | |
|---|---|---|---|---|---|---|
| pH | Solute | | Aldehydes, g.-moles | Acids, g.-moles | Aldehydes, Percent of theo. | Acids, Percent of theo. |
| 5.55 | $KH_2PO_4$ | 1 | 0.01188 | 0.00126 | 59 | 6 |
| 8.86 | $KH_2PO_4$, $K_2HPO_4$ | 1 | 0.0128 | 0.0030 | 64 | 15 |
| >11 | KOH | 1 | 0.01084 | 0.0048 | 54 | 24 |

Example III 1-octadecene was ozonized at a series of pH levels as described above. In each experiment, 2.53 grams of 1-octadecene were introduced into the reaction vessel. The results were as follows:

| Aqueous Solution | | Experiment | Product | | Yield | |
|---|---|---|---|---|---|---|
| pH | Solute | | Aldehydes, g.-moles | Acids, g.-moles | Aldehydes, Percent of theo. | Acids, Percent of theo. |
| <1 | N/10H$_2$SO$_4$ | 1 | 0.0159 | 0.00156 | | |
| | | 2 | 0.0160 | 0.00140 | | |
| | | Average | | | 80 | 7.8 |
| <1 | N/2H$_2$SO$_4$ | 1 | 0.0152 | 0.0021 | 76 | 10 |
| 4.75 | NaOAc, HOAc | 1 | 0.01470 | 0.0011 | 74 | 11 |
| 6.70 | KH$_2$PO$_4$, K$_2$HPO$_4$ | 1 | 0.0182 | 0.0020 | 91 | 10 |
| 7.50 | Same | 1 | 0.0193 | 0.0020 | 97 | 10 |
| 7.75 | Same | 1 | 0.0196 | 0.0021 | 97 | 10 |
| 8.05 | Same | 1 | 0.0152 | 0.0022 | 76 | 11 |
| 8.86 | Same | 1 | 0.0177 | 0.0032 | | |
| | | 2 | | 0.0027 | | |
| | | Average | | | 86 | 15 |
| 9.5 | K$_2$HPO$_4$, KOH | 1 | 0.0185 | 0.0020 | 93 | 10 |
| 11.65 | K$_3$PO$_4$ | 1 | 0.0142 | 0.00374 | 71 | 19 |
| >11 | KOH | 1 | 0.0109 | 0.0107 | | |
| | | 2 | 0.0092 | 0.0102 | | |
| | | Average | | | 50 | 52 |

The results are plotted in the attached graph. It will be observed therein that the production of acids is a function of pH, and that higher pH levels produce greater yields of acids than lower pH levels, a pronounced break in the acid production-versus-pH curve taking place around pH 9.

While we have described our invention in connection with certain specific charging stocks, reaction conditions, and manipulative techniques, it is to be understood that we are not limited thereto. Our invention is applicable and useful broadly within the scope of our disclosure thereof, and it is to be distinctly understood that any modifications or equivalents that would ordinarily occur to one skilled in the art are to be considered as lying within the scope of our invention.

In accordance with the foregoing description, we claim as our invention:

1. A process for preparing a carboxylic acid and an aldehyde from an olefinic hydrocarbon having the formula RCH=CHR', where R and R' are substituents selected from the group consisting of hydrogen and organic radicals, which comprises intimately commingling said olefinic hydrocarbon with an immiscible aqueous phase, maintaining the pH of said aqueous phase above about 9 by incorporating therein an alkaline compound of a metal selected from the group consisting of the alkali metals and the alkaline-earth metals, passing ozone through the resulting mixture at a temperature between about 35 and 150° F., and separating a carboxylic acid and an aldehyde from the resulting reaction product.

2. A process for preparing a carboxylic acid and an aldehyde from an olefinic hydrocarbon having the formula RCH=CHR', where R and R' are substituents selected from the group consisting of hydrogen and organic radicals, which comprises intimately commingling said olefinic hydrocarbon with an immiscible aqueous phase containing an alkali-metal hydroxide in at least equimolar ratio to said olefinic hydrocarbon, passing ozone through the resulting mixture at a temperature between about 35 and 150° F., and separating a carboxylic acid and an aldehyde from the resulting reaction product.

References Cited in the file of this patent

UNITED STATES PATENTS 1,423,753    Carter et al. _____ July 25, 1922

OTHER REFERENCES

Long: "The Ozonization Reaction," "Chem. Reviews," vol. 27, pages 437–493 (1940).